(12) United States Patent
Chyan et al.

(10) Patent No.: US 11,099,131 B2
(45) Date of Patent: Aug. 24, 2021

(54) SYSTEMS AND METHODS FOR COPPER ETCH RATE MONITORING AND CONTROL

(71) Applicant: University of North Texas, Denton, TX (US)

(72) Inventors: Oliver Ming-Ren Chyan, Denton, TX (US); Alex Lambert, Denton, TX (US)

(73) Assignee: University of North Texas, Denton, TX (US)

( * ) Notice: Subject to any disclaimer, the term of this patent is extended or adjusted under 35 U.S.C. 154(b) by 171 days.

(21) Appl. No.: 16/465,238

(22) PCT Filed: Dec. 6, 2017

(86) PCT No.: PCT/US2017/064929
§ 371 (c)(1),
(2) Date: May 30, 2019

(87) PCT Pub. No.: WO2018/106816
PCT Pub. Date: Jun. 14, 2018

(65) Prior Publication Data
US 2019/0323962 A1  Oct. 24, 2019

Related U.S. Application Data

(60) Provisional application No. 62/432,115, filed on Dec. 9, 2016.

(51) Int. Cl.
*G01N 21/552* (2014.01)
*C23F 1/08* (2006.01)
(Continued)

(52) U.S. Cl.
CPC ............. *G01N 21/552* (2013.01); *C23F 1/08* (2013.01); *C23F 1/18* (2013.01); *G01J 3/42* (2013.01); *G01N 21/05* (2013.01); *G01N 21/31* (2013.01)

(58) Field of Classification Search
CPC ...... C23F 1/08; C23F 1/18; G01J 3/42; G01N 2021/8416; G01N 21/05; G01N 21/17; G01N 21/31; G01N 21/552
See application file for complete search history.

(56) References Cited

U.S. PATENT DOCUMENTS 5,185,834 A     2/1993  Day et al.
5,376,214 A  *  12/1994  Iwasaki .................. G01N 21/31
                                                          156/345.15
(Continued)

FOREIGN PATENT DOCUMENTS

| KR | 20130013474 A | 2/2013 |
| WO | WO-8600094 A1 | 1/1986 |
| WO | WO-2016090407 A1 | 6/2016 |

OTHER PUBLICATIONS

Zhang, N. et al. "Chemical Speciation in Concentrated Aqueous Solutions of $CuCl_2$ Using Thin-film UV-visible Spectroscopy Combined with DFT Calculations" Journal of Molecular Liquids, 2014, vol. 198, pp. 200-203, 4 pages.
(Continued)

*Primary Examiner* — Hina F Ayub
(74) *Attorney, Agent, or Firm* — Norton Rose Fulbright US LLP

(57) ABSTRACT

Systems and methods for copper etch monitoring and control are described. Certain embodiments include utilizing thin-film cells to measure the absorbance of a copper etch solution to determine the etch rate of the solution. In another embodiment, a method of controlling etch rate of a copper etch solution includes detecting characteristics of the copper etch solution utilizing a sensor device, e.g., flow cell and/or attenuated total reflection probe, calculating, based on the detected characteristics of the copper etch solution, the etch rate of the copper etch solution, and adjusting the etch rate
(Continued)

of the copper etch solution in response to the calculated etch rate deviating from a specified value.

44 Claims, 9 Drawing Sheets

(51) Int. Cl.
| | | |
|---|---|---|
| *C23F 1/18* | (2006.01) | |
| *G01J 3/08* | (2006.01) | |
| *G01J 3/42* | (2006.01) | |
| *G01N 21/05* | (2006.01) | |
| *G01N 21/31* | (2006.01) | |
| *G01N 21/84* | (2006.01) | |
| *G01N 21/17* | (2006.01) | |

(56) References Cited

U.S. PATENT DOCUMENTS

| | | |
|---|---|---|
| 5,456,795 A | 10/1995 | Danjo et al. |
| 6,363,294 B1 | 3/2002 | Coronel et al. |
| 6,551,521 B1 | 4/2003 | Culpovich et al. |
| 8,852,967 B2 | 10/2014 | Mirth |
| 2006/0151429 A1* | 7/2006 | Kitsunai ............ H01J 37/32935 216/59 |
| 2006/0163206 A1* | 7/2006 | Belov ................. C09K 3/1454 216/88 |

OTHER PUBLICATIONS

International Search Report and Written Opinion issued for PCT Application No. PCT/US2017/064929, dated Jan. 31, 2018, 11 pages.

* cited by examiner

SYSTEMS AND METHODS FOR COPPER ETCH RATE MONITORING AND CONTROL

CROSS-REFERENCE TO RELATED APPLICATION

This application is a national phase application under 35 U.S.C. § 371 of International Application No. PCT/US2017/064929 filed Dec. 6, 2017, which claims priority to U.S. Provisional Patent Application No. 62/432,115 filed Dec. 9, 2016. The entire contents of each of the above-referenced disclosures is specifically incorporated by reference herein without disclaimer.

TECHNICAL FIELD

The present disclosure relates generally to copper etching techniques and, more particularly, using spectroscopy to monitor and control copper etch rate.

BACKGROUND

The fabrication of microelectronics—semiconductors, printed circuit boards (PCBs), and the like—generally involves numerous process steps. One commonly utilized process is copper etching. To ensure the finished microelectronic device has suitable electrical characteristics, copper feature dimensions, e.g., depth and width of interconnects as well as undercut and etch factor, must be tightly controlled. Monitoring and controlling etch rate is critical to ensure proper feature dimensions and as feature sizes continue to shrink, the ability to precisely control copper etch is becoming more important.

Copper features are typically etched using subtractive etching processes. For instance, cupric chloride solutions are commonly used in the microelectronics industry due to the ability to regenerate and reuse the solution for subsequent etches, thereby reducing waste and increasing efficiency. High concentrations of Cu(II) ion in the form of $CuCl_2$ are generally utilized in hydrochloric acid (HCl) to react with copper, which generates Cu(I) ions. The chemical relationship is demonstrated by the equation $Cu^{2+}+Cu \rightarrow 2Cu^+$. The resulting Cu(I) may be oxidized back to Cu(II) by exposing the solution to air and/or by the addition of an oxidizer, e.g., hydrogen peroxide ($H_2O_2$), and reused for further etching. After subsequent etches and regeneration, the chemical equilibrium of cupric chloride etch solution changes, resulting in unpredictable etch rates. Current methods to monitor the etch rate of cupric chloride etch solution include measuring oxidation-reduction potential (ORP), conductivity, and specific gravity/density.

One known method for monitoring etch rate includes measuring ORP of the etch solution. ORP is sensitive to Cu(I), in that a new redox couple, Cu(I)/Cu(II), is established in the solution after an initial etch sequence that was not in the solution before, thereby changing ORP. However, ORP is not sensitive to other changes in chemical equilibrium, e.g., Cu(II) and $Cl^-$. Cu(I) itself only partially accounts for the change in etch rate, as adding Cu(I) does not significantly decrease etch rate. ORP therefore provides a narrow view of the complex chemical equilibrium of the etch solution as a whole.

Another known method for monitoring etch rate includes measuring conductivity of the etch solution. Conductivity generally indicates the amount of ionic strength due to cupric ions, chloride ions, and protons. Conductivity is very complex, e.g., addition of Cu(II) decreases conductivity even though there are more ions in solution, so conductivity is not simply an additive function and depends on the whole of the chemical equilibrium of the solution. In addition, conductivity is not linear with etch rate and is not chemically specific. For example, different combinations of ions, e.g., $H^+$, $Cl^-$, Cu(II), Cu(I), and $CuCl_x^{2-x}$, can produce the same conductivity even though the combinations would have different chemistry and therefore a different etch rate.

Another known method for monitoring etch rate includes measuring the specific gravity/density of the etch solution. Density is correlated to the concentration of copper in solution but also fails to be linearly correlated with etch rate across multiple etches and after regeneration. In addition, density is not a sensitive parameter, so narrow control ranges are not easily observable. Further, density is mass-sensitive rather than chemically sensitive. So, while two different etch solutions may have the same density, they may have completely different etch chemistry make up, and therefore differing etch rate and etch factor.

With these existing solutions, precisely controlling copper etch rate is difficult. These non-chemically specific indicators fail to account for various chemical equilibrium conditions of the etch solution and cannot accurately predict etch rate.

SUMMARY

The present application is directed to systems and methods that provide for copper etch monitoring and control by detecting characteristics of a copper etch solution. In one embodiment, a method for monitoring etch rate of a copper etch solution includes providing a cuvette, where the cuvette is a thin-film cell configured such that the copper etch solution is contained within the thin-film cell, detecting absorbance of the copper etch solution, wherein the absorbance is detected at one or more wavelength, and calculating, based on the detected absorbance of the copper etch solution, the etch rate of the copper etch solution.

In another embodiment, a method for controlling etch rate of a copper etch solution includes detecting, by a spectrophotometer, characteristics of the copper etch solution, calculating, based on the detected characteristics of the copper etch solution, the etch rate of the copper etch solution. The method further includes adjusting one or more settings corresponding to the copper etch solution in response to the calculated etch rate deviating from a specified value.

In another embodiment, an etch rate monitoring system includes a sensor device (e.g., a flow cell and/or an attenuated total reflection probe) configured to be utilized with a copper etch solution. The system further includes a spectrophotometer coupled to the sensor device, wherein the spectrophotometer is configured to detect characteristics of the copper etch solution. Additionally, the system includes at least one processing device configured to monitor the detected characteristics of the copper etch solution and calculate the etch rate of the copper etch solution.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
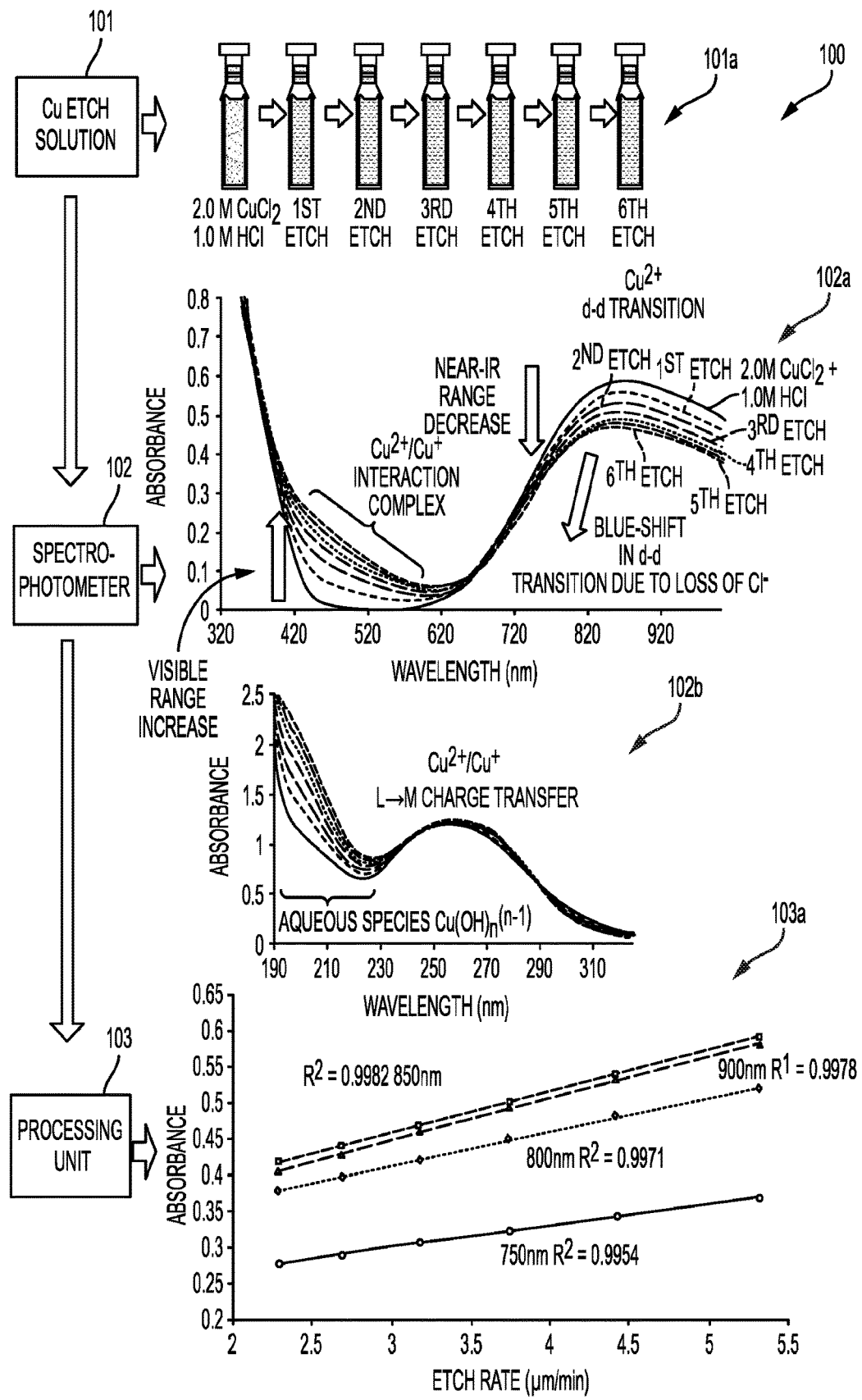
FIG. 1 illustrates a block diagram and associated graphs of a system for monitoring etch rate of a copper etch solution in accordance with an embodiment of the present application.

FIG. 1 illustrates a block diagram and accompanying graphs of copper etch rate monitoring system 100 in accordance with an embodiment of the present application. System 100 may include Cu etch solution 101, spectrophotometer 102, and processing unit 103. Cu etch solution 101 may include various subtractive etch solutions for etching copper. For instance, embodiments may include a cupric chloride etch solution wherein the cupric chloride/copper etch reaction is generally represented by the equation $Cu^{2+}+Cu \rightarrow +2Cu^+$. In one embodiment, Cu etch solution 101 may comprise a 2.0 M $CuCl_2$. and 1.0 M HCl solution. In other embodiments, the concentrations of various components of the Cu etch solution 101 may vary. In other embodiments, Cu etch solution 101 may include ferrous chloride, cuprous chloride, and the like, or any combination thereof for the purpose of etching copper.

The overall cupric chloride copper etch process reaction can be depicted as $CuCl_2+Cu \rightarrow 2CuCl$. However, this is a simplistic view of the speciation of cupric and cuprous complexes in aqueous solution as there is a wide range of hydrate and chloride complexes involved. The exemplary 2.0 M $CuCl_2$. and 1.0 M HCl acidic solution has a pH of approximately 0 to 1. It is appreciated that other solutions of varying component concentrations may have either higher or lower pH values. In acidic solutions such as this, relevant sets of complexes during etching include $Cu(II)Cl_x^{2-x}$ and $Cu(I)Cl_x^{1-}x$, which coordinate with water in a series of complexes:

| Cu(I) species | Cu(II) species |
|---|---|
| $[Cu(H_2O)_n]^+$ (n ≥ 4) | $[Cu(H_2O)_n]^{2+}$ (n ≥ 4) |
| $[Cu(H_2O)_{n-1}Cl]$ | $[Cu(H_2O)_{n-1}Cl]^+$ |
| $[Cu(H_2O)_{n-2}Cl_2]^-$ | $[Cu(H_2O)_{n-2}Cl_2]$ |
| $[Cu(H_2O)_{n-3}Cl_3]^{2-}$ | $[Cu(H_2O)_{n-3}Cl_3]^-$ |
| $[Cu(H_2O)_{n-4}Cl_4]^{3-}$ | $[Cu(H_2O)_{n-4}Cl_4]^{2-}$ |

Although not illustrated in FIG. 1, it is noted that Cu etch solution 101 may be utilized in an etch bath/machine in order to etch copper located on PCBs, high density PCBs, semiconductors, and the like. Further, it is appreciated that Cu etch solution 101, e.g. cupric chloride, may be regenerated with the addition of $H_2O_2$, $Cl_2$, $NaClO_3$, and/or various other methods, the details of which are well known in the art and will not be discussed in detail.

As illustrated by cuvette image 101a, the exemplary 2.0 M $CuCl_2$. and 1.0 M HCl Cu etch solution 101 visibly changes color after successive etches. Specifically, before etch, the color of Cu etch solution 101 is a light green and generally translucent. After subsequent etches, Cu etch solution 101 changes shade to a darker, less translucent green and eventually to a dark brown color. It is appreciated that, in other embodiments, Cu etch solution 101 may differ in color and translucency but in general, Cu etch solution 101 will decrease in translucency after subsequent etches. At various stages of the etch process, samples of Cu etch solution 101 may be obtained and transferred into a cuvette or similar medium as is described in more detail below. In certain embodiments, the cuvette is a thin-film cell configured at a certain path length such that Cu etch solution 101 may be contained within the thin-film cell to facilitate transmitting an electromagnetic signal through the thin-film cell and Cu etch solution 101 contained within. Since typical copper etch solutions are highly concentrated, too large of a path length may result in noisy and/or saturated signals. The transmitted signal may then be detected. Based on the detected electromagnetic signal, the absorbance of Cu etch solution 101 may be measured at various wavelengths. Processing unit 103 may then be used to calculate, based on the measured absorbance of Cu etch solution 101, the etch rate of Cu etch solution 101.

In certain embodiments, spectrophotometer 102 is utilized to detect and measure characteristics (e.g., absorbance, reflectance, and/or transmittance) of Cu etch solution 101. While system 100 is illustrated in FIG. 1 as using spectrophotometer 102, it is appreciated that spectrophotometer 102 may represent any type of system used to measure transmission, absorption, and/or reflection of Cu etch solution 101. Further, it is noted that certain embodiments described herein may relate to spectroscopy over a wide range of wavelengths, including ultraviolet, visible, near infrared, and infrared. It is appreciated that reference to a particular type of spectroscopy (e.g., UV spectroscopy, UV-Vis spectroscopy, UV-Vis-NIR spectroscopy, or the like) is not intended to limit an embodiment to that type of spectroscopy. For example, reference to UV-Vis herein is not limited to detecting wavelengths in only the UV and visible spectrum. In certain embodiments, one type of spectroscopy may be used instead of another, or a combination of multiple types may be used. For example, infrared (IR) spectroscopy may be utilized in conjunction with an attenuated total reflectance (ATR) probe where an IR signal may otherwise be too strongly attenuated in a highly absorbing copper etch solution.

Spectrophotometer 102 may operate in a number of ways. For instance, a cuvette (e.g., cuvette samples 101*a*) may be filled with Cu etch solution 101. In certain embodiments, e.g., where Cu etch solution 101 comprises cupric chloride solution as described above, Cu etch solution 101 may be highly concentrated, e.g., to the point that the solution may saturate spectrophotometer 102 detectors and thereby not be able to be measured properly. As such, embodiments may include the use of a cuvette that has a small path length to ensure reliable detection of absorbance. Certain embodiments include using a cuvette with a path length less than 0.01 mm. In one embodiment, system 100 utilizes a thin-film cuvette with path length of 0.07 mm such that a noise-free and unsaturated etch solution spectrum may be detected. One such embodiment is illustrated by cuvette samples 101*a*, which represent Cu etch solution 101 sampled over six consecutive etches. Other embodiments may include utilizing attenuated total reflectance (ATR) as an alternative or in conjunction with other embodiments discussed herein. ATR monitoring probes may comprise a hollow core, optical fiber core, and/or combined with optical ATR elements, e.g., sapphire and other suitable optical materials, to collect spectrum data as will be discussed further below.

Different fabrication techniques of thin-film cells may be employed. For instance, quartz slides may be clamped together to trap Cu etch solution 101 at a certain path length that is defined by a spacer also trapped between the slides or an etched trench in the quartz. In other embodiments, quartz slides may be molded together with epoxy or glassblowing techniques to form a fixed-path length cell, wherein the path length is defined as before. Further, the quartz slides may be etched by reactive ion etching and/or plasma ion etching to precisely control the optical cell path. Positive spacers may be created with industrial materials applied through physical vapor deposition (PVD), machining, adhesives, etc., to create layers of desired thickness around the edge of a window/path length area. Negative spacers may be created using wet-etching methods (e.g. chemical mechanical polishing) and/or dry etching methods (e.g., plasma ion etching and reactive ion etching). In other embodiments, an ATR crystal may be used as a wave guide, inserted into Cu etch solution 101 to direct light in and out of Cu etch solution 101. In other embodiments, Cu etch solution 101 may be flowed through a flow cell rather than a cuvette, as will be discussed further below.

Processing samples of Cu etch solution 101 with spectrophotometer 102 may generate spectral data representing the copper etch reactions. For example, chart 102*a* illustrates the spectra of 2.0 M $CuCl_2$. and 1.0 M HCl Cu etch solution 101 over the course of six consecutive etches, e.g., the spectra obtained from six samples illustrated in cuvette samples 101*a*. Chart 102*a* illustrates absorbance versus wavelength for the pre-etch solution (2.0 M $CuCl_2$. and 1.0 M HCl) as well as six subsequent etches obtained without regeneration of the solution between etch successive etch.

Chart 102*a* illustrates absorbance versus wavelength for an exemplary etch solution comprising $CuCl_2.2H_2O$ (Acros) and 36% HCl (Baker), diluted with Ultra-Pure Water. Etching measurements were made using copper panels 35 μm thick (front and back of epoxy core) cut into 2×2 cm coupons and suspended in 30 mL of solution for 6 min at 40° C. under constant stirring. Etch rates were calculated from the weight change of the coupons before and after etching using an analytical balance. Repeated etch sequences were conducted by sequentially adding and removing fresh copper coupons to portions of solution. UV-Vis measurements were taken with an Agilent 8453 UV-Vis spectrophotometer using quartz cells of 70 μm path length fabricated according to the methods described herein. For comparison to current methods to measure etch rate, ORP measurements were conducted using a CHI 440 potentiostat with a standard 3-electrode setup with Ag/AgCl reference, conductivity measurements were conducted with a ThermoFisher Orion Star Benchtop Two-Electrode Cell at 40° C., and density/specific gravity measurements were recorded gravimetrically with 25 mL aliquots pipetted into 25 mL volumetric flasks.

As illustrated by chart 102*a*, several features of the spectra over 320-1000 nm demonstrate qualitative indicators of the chemical specificity of the exemplary Cu etch solution 101. Within the near-IR region (approximately 700-2500 nm) there is a peak at approximately 860 nm that decreases in intensity with successive etches. This may be caused by a d-d transition involving a copper-chloride complex. Cu(I), as a $d^{10}$ ion, does not give rise to d-d transitions. As the pre-etch solution has no Cu(I), the 860 nm peak may then arise from a cupric chloride complex or series of complexes. The peak also decreases in intensity with etching, which adds Cu(I) and cuprous complexes to the solution, further indicating that the peak is due to a cupric complex.

An additional qualitative feature includes a shoulder increase in the visible range (approximately 400-700 nm) upon etching. This 420-600 nm increase in absorbance appears upon etching and addition of Cu(I) to the solution. The increase of this feature with copper-acidic chloride solutions may be due to a mixed-valence Cu(I)/Cu(II) interaction complex. This feature demonstrates that UV-Vis spectra of etch solutions display a sensitivity to Cu(I) addition to the solution. In addition, this feature explains the color change seen in solution after etching as illustrated by cuvette samples 101a. Visible-region wavelengths absorbed in the pre-etch solution include 620-800 nm (red) and 400-430 nm (violet), which produce a visual color of green. As the etching progresses, the visible range increases in intensity such that the solution appears brown.

In other embodiments, an ultra-thin film cell may be incorporated into system 100 such that the saturated UV region may be analyzed. For instance, cuvettes may be manufactured such that the UV spectrum is not substantially saturated. For example, path length may be adapted such that the spectra is placed in the desired absorbance range that is high enough to maximize the dynamic range of the calibration and low enough to minimize noise in the signal. In certain embodiments, multiple cells and path lengths may be possible, e.g., one with a 50-200 path length to observe visible/near-IR range features, which are of lower intensity, and one with a 1-10 tan path length to observe the high-intensity ultraviolet features.

With reference to chart 102b, further information is revealed at the super-concentrated UV region using an ultra-thin film cell. Chemical equilibrium changes are visible throughout the etch processes and speciation information may be gleaned from the qualitative data. A $Cu^{2+}/Cu^{+}$ L→M charge transfer is observed. Further, the absorbance in the 190-220 nm range increases linearly with each successive etch, which can be quantitatively determined by processing unit 103 in order to calibrate, monitor, and adjust etch rate as described above. In certain embodiments, the shape of the absorbance spectra may be analyzed (e.g., with respect to prior spectra shape analysis) to determine etch rate and other characteristics of Cu etch solution 101.

In addition to the qualitative data obtained from spectrophotometer 102, as demonstrated by chart 102a, quantitative data may be obtained and applied by processing unit 103. In certain embodiments, processing unit 103 may be utilized to analyze data from spectrophotometer 102. The data may be processed to provide for the monitoring and control of etch rate. For instance, chart 103a illustrates a plot of the absorbance of Cu etch solution 101 at various wavelengths versus the resulting etch rate of that solution. Chart 103a demonstrates linear best fit lines for 750 nm ($R^2$=0.9954), 800 nm ($R^2$=0.9971), 850 nm ($R^2$=0.9982), and 900 nm ($R^2$=0.9978). A linear relationship throughout 750-900 nm exists between absorbance and etch rate. With this quantitative data, processing unit 103 may both actively monitor the etch rate of Cu etch solution 101 and predict the etch rate of a given bath. For instance, obtaining the absorbance of a separate etch bath may be computed by processing unit 103 to estimate the etch rate of that solution. This data may be continuously updated in order to adjust the formulas used by processing unit 103 to calibrate, and/or maintain etch rate of a given solution. System 100 may be set up as a continual/continuous monitoring device of an etch solution. For instance, side-by-side spectra of an etch bath solution that was performing within limits and one that was not could be used to check if certain aspects of the chemical equilibrium was the culprit for the poor-performing etch solution.

For use as a monitoring tool, UV-Vis calibration in relation to etch rate used on the above example has the added benefit of being independent of the wavelength used in the calibration. During the process of etching, the absorbance intensity at any wavelength from 750-900 nm decreases linearly with etch rate, as shown in chart 103a. This removes the possibility of noise playing a factor in the etch rate, as multiple points could be monitored to predict the etch rate.

Using the foregoing method, Cu etch solution may be re-calibrated depending on the determined etch rate. For instance, calibration may be set up on an individual reaction system. A variety of calibration points may be used, for instance, at the 860 nm wavelength. Using the methods described herein, the absorbance can be obtained from Cu etch solution 101 pre- and/or post-etch via spectrophotometer 102, and plotted using processor unit 103. A portion of solution can be analyzed to determine, before the next etching process, what the targeted etch rate will be. By analyzing the spectra after successive etches, future etch rates may be predicted. In turn, etch time may be increased to compensate for a decrease in etch rate. Alternatively, Cu etch solution 101 may be modified to adjust the etch rate. When the solution has been modified, e.g., regenerated with $H_2O_2$ or the like, the solution may be re-tested and etch rate determined by processor unit 103. Likewise, new tools with new solutions may be calibrated and monitored using the same methods as described.

In certain embodiments, absorbance of Cu etch solution 101 may be detected by spectrophotometer 102 over a wide range of wavelengths, such that processing unit 103 may calculate etch rate by analyzing the absorbance over a wide range of wavelengths. For example, processing unit 103 may analyze the data points that represent detected absorbance over a range of wavelengths that create a shape of spectra (see e.g., chart 102a and chart 102b). Analyzing the shape of the spectra over certain wavelength ranges may be used to calculate the etch rate and predict future etch rate as a result of various conditions. This provides for two-dimensional monitoring, not only of peak height, but also of peak shape of the features in the spectra. For example, primary species in Cu etch solution 101 may be identified (e.g., $CuCl_2$, HCl, $H_2O$, $H_2O_2$), then an analysis may be programmed into software of processing unit 103 in order to identify speciation of the bath and subsequent etch rate based on the spectra shape.

Figure 2A:
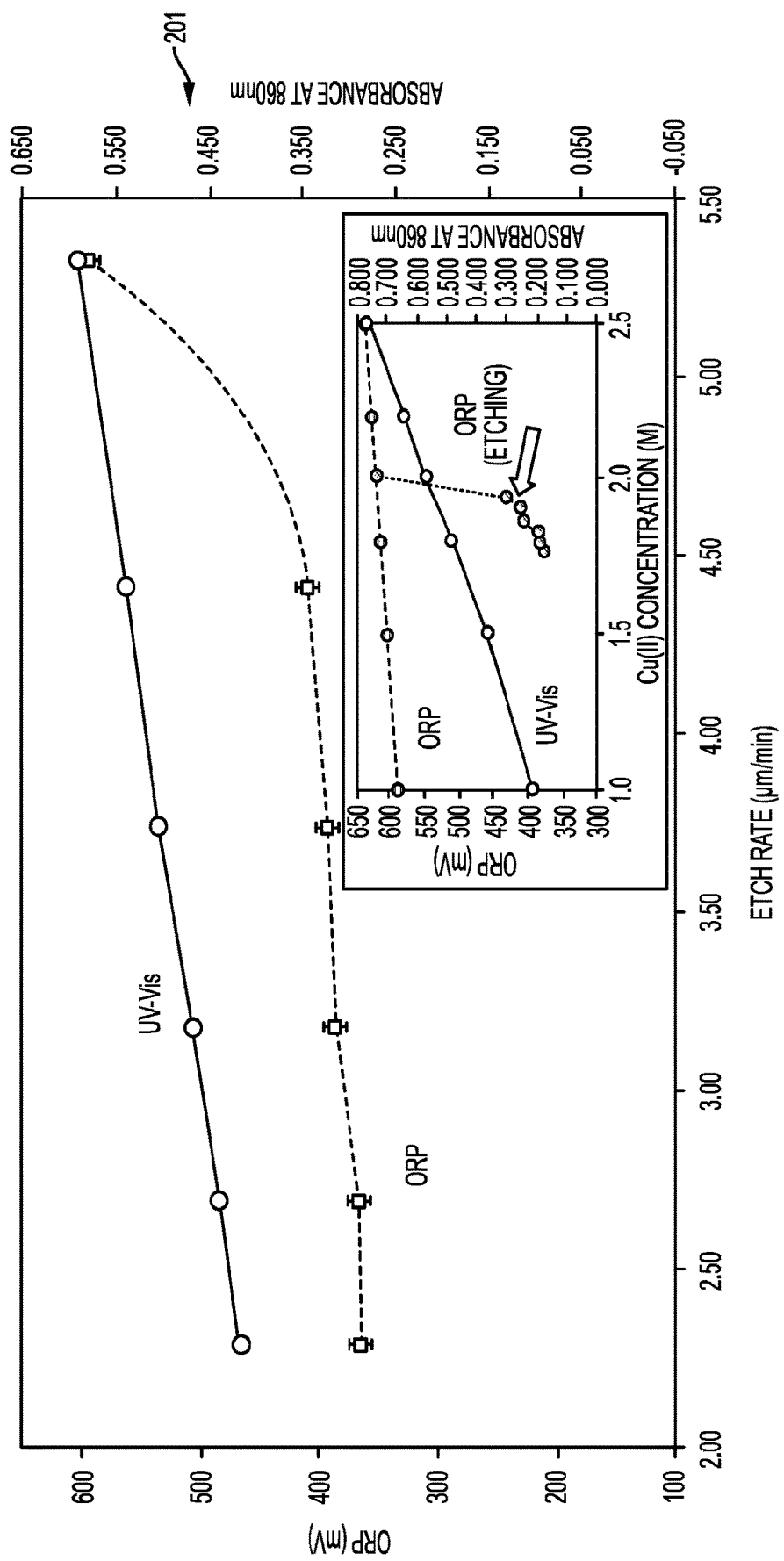
FIG. 2A illustrates a graph monitoring etch rate performance in accordance with an embodiment of the present application.
Figure 2B:
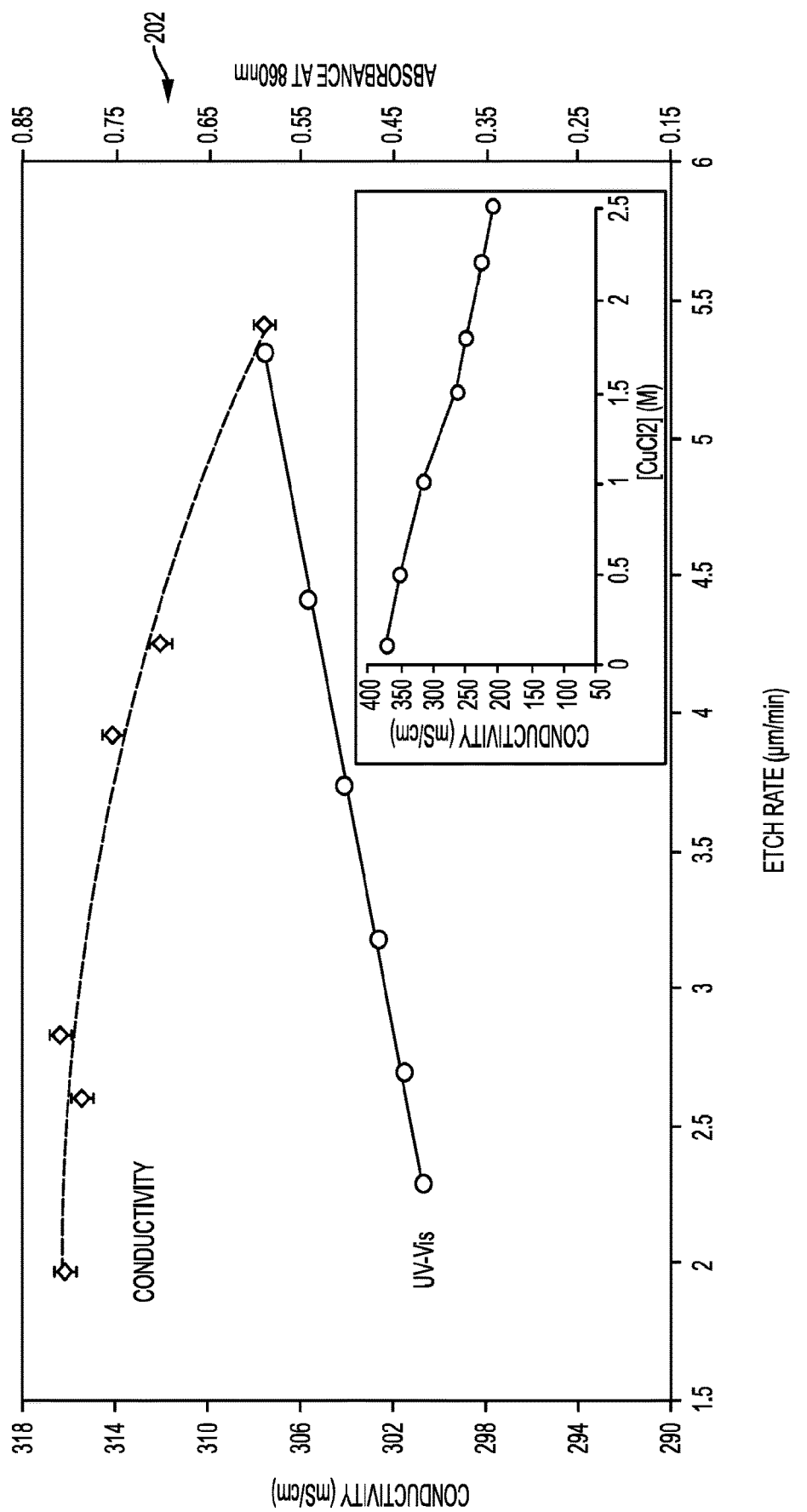
FIG. 2B illustrates a graph monitoring etch rate performance in accordance with an embodiment of the present application.
Figure 2C:
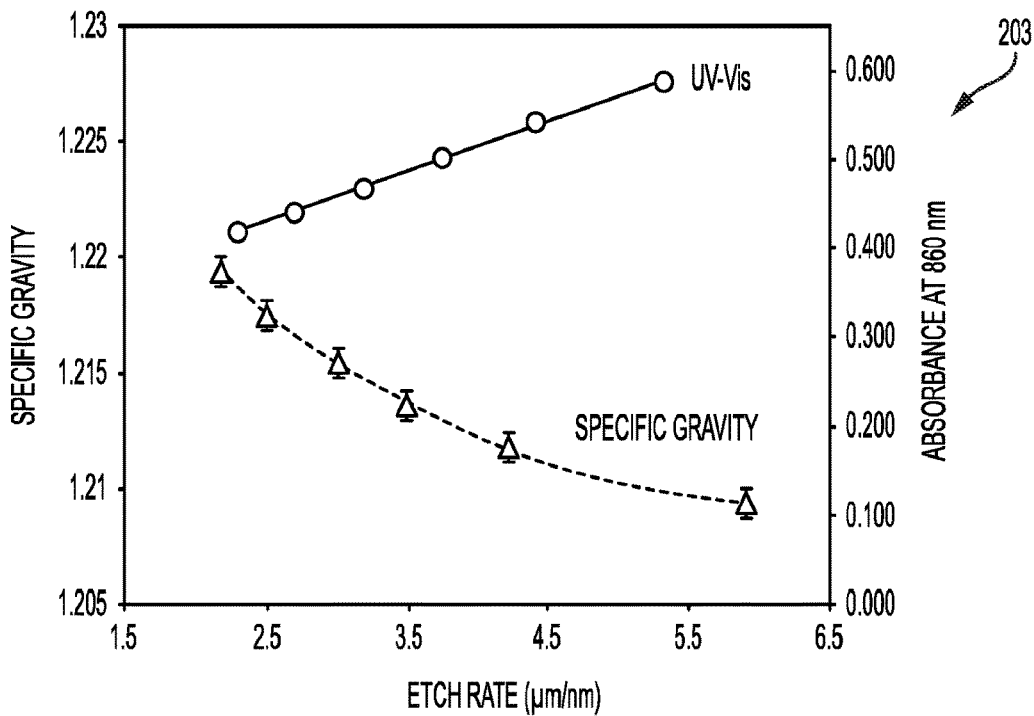

As illustrated by FIGS. 2A-2C, current methods to monitor etch rate, e.g., ORP, conductivity, and density, lack precision and linearity as opposed to the exemplary systems and methods described herein. Chart 201 illustrates change in ORP and UV-Vis absorbance versus etch rate over a successive-etching sequence. Chart 201 inset illustrates ORP and UV-Vis absorbance of pre-etch solutions of varying $CuCl_2$ concentrations (1.0 M HCl) and ORP change during etch sequence versus Cu(II) concentration. ORP indicates the oxidizing power of the solution, and as an indicator of the equilibrium of the solution, is sensitive to Cu(I) concentration. This is demonstrated by the Nernst Equation:

$$E = E° - \frac{0.0591}{n} \log \frac{[Cu(I)]}{[Cu(II)]}.$$

Before etching, the predominant redox-active species is Cu(II), as there are only infinitesimal levels Cu(I) in the solution. After initiating the etch process, the redox equilibrium shifts and ORP is established by a new redox couple—Cu(I)/Cu(II)—not previously present in the solution. This shifts the ORP upon the initial etch, as shown in chart 201.

However, this specific sensitivity limits the utility of ORP as an indicator of the complex equilibrium and conditions of the etch solution as a whole. For example, as seen in chart 201 inset, increasing the $CuCl_2$ concentration from 1.0 M to 2.5 M (134 g/L to 335 g/L), with constant HCl, changes the ORP by 40 mV. By contrast, the addition of just 0.1 M Cu(I) (6 g/L) via Cu etching changes the ORP by 190 mV. The levels of cupric ion and chloride are fundamental to the complex changes in the chemical equilibrium during etching, but ORP is not very sensitive to those changes. Overall, ORP is not well correlated to etch rate as seen in chart 201 and does not give the full picture of the conditions and etching power of the etch solution.

Embodiments described herein provide an improvement over ORP measurement by adding a quantitative element to the monitoring of Cu(I). The visible range of the spectrum (420-600 nm), though perhaps a multivalent complex, is directly dependent on the level of Cu(I) in the solution, and a correlation of visible range absorbance versus Cu(I) added is linear. Further, the 860 nm peak in the UV-Vis has increased sensitivity to Cu(II) concentration as seen in the inset of chart 201. Embodiments described herein may include the qualitative and quantitative capability to measure both Cu(I) and Cu(II).

Chart 202 illustrates a change in conductivity and UV-Vis absorbance versus etch rate over a successive-etching sequence. Chart 202 inset illustrates conductivity of pre-etch solutions of varying $CuCl_2$ concentration (1.0 M HCl). As a monitoring tool, conductivity can indicate the amount of ionic strength of the etch solution due to cupric ions, chloride ions, and protons and can serve as a guide for the general condition of the solution. However, conductivity is complex and depends on many aspects of the solution chemistry. For example, Cu(II) ion addition in the form of $CuCl_2$ decreases the conductivity of the solution even though many ions have been added to the solution as seen in chart 202 inset. Conductivity is not simply an additive function and depends on the whole of the chemical equilibrium in the solution. In addition, conductivity is not chemically specific and different ionic species combinations, e.g., Cu(I), Cu(II), $Cl^-$, $H^+$, can produce the same conductivity even though they would have a different chemistry and therefore different etch rates and etch factors. The embodiments described herein provide identification of the chemical origins of changes in conductivity. In addition, conductivity is not sensitive to changes in the chemical equilibrium during etching. For example, whereas conductivity changes 3% over the course of an etch sequence, UV-Vis absorbance at 860 nm changes 29% over the same sequence. Further, conductivity does not respond linearly to these changes, while embodiments described herein are linear.

Chart 203 illustrates a change in specific gravity/density and UV-Vis absorbance versus etch rate over a successive-etching sequence. Since copper is typically the heaviest species in the etch solution, specific gravity is correlated with the concentration of copper in the solution, which accounts for its use in monitoring. While specific gravity is a mass-sensitive tool, it is not sensitive to changes in chemical equilibrium that cause the change in mass. Over the course of etching, specific gravity is not linear with etch rate as seen in chart 203. Further, it is difficult to predict what changes will occur over the course of etching since specific gravity is an intensive property and depends on the complex chemical equilibrium changes of the solution. The actual specific gravity increase during the etch process is only an average of 70% of the increase that would be expected if density was purely additive based on the mass. Specific gravity measurements are also affected by other processes such as addition of $H_2O_2$ or HCl, Cu etching, evaporation, etc., which cause density changes. For instance, two copper etch solutions may have the same monitored specific gravity values, e.g., within control specifications, but have completely different etch chemistry make up, resulting in different etch rate and etch factor. The embodiments described herein may distinguish between contributions from these different processes.

Specific gravity is also not very sensitive to significant changes in the solution. In the exemplary etch sequence above, a reduction of etch rate by 60% changes the specific gravity by <1%. Each successive etch, equivalent to a 15% decrease in etch rate, only increases the specific gravity by <2 g/L, an increase of <0.2%. While commercial densitometers can measure to an accuracy of 1 g/L, this narrow margin is easily subject to error. Larger changes in specific gravity would only be attained after several repetitions of etching and regeneration, after which the chemical equilibrium will have shifted many times and in complex ways. Certain embodiments described herein have increased sensitivity with an overall 29% change in intensity over the course of an etching sequence (5% per step).

Figure 3A:
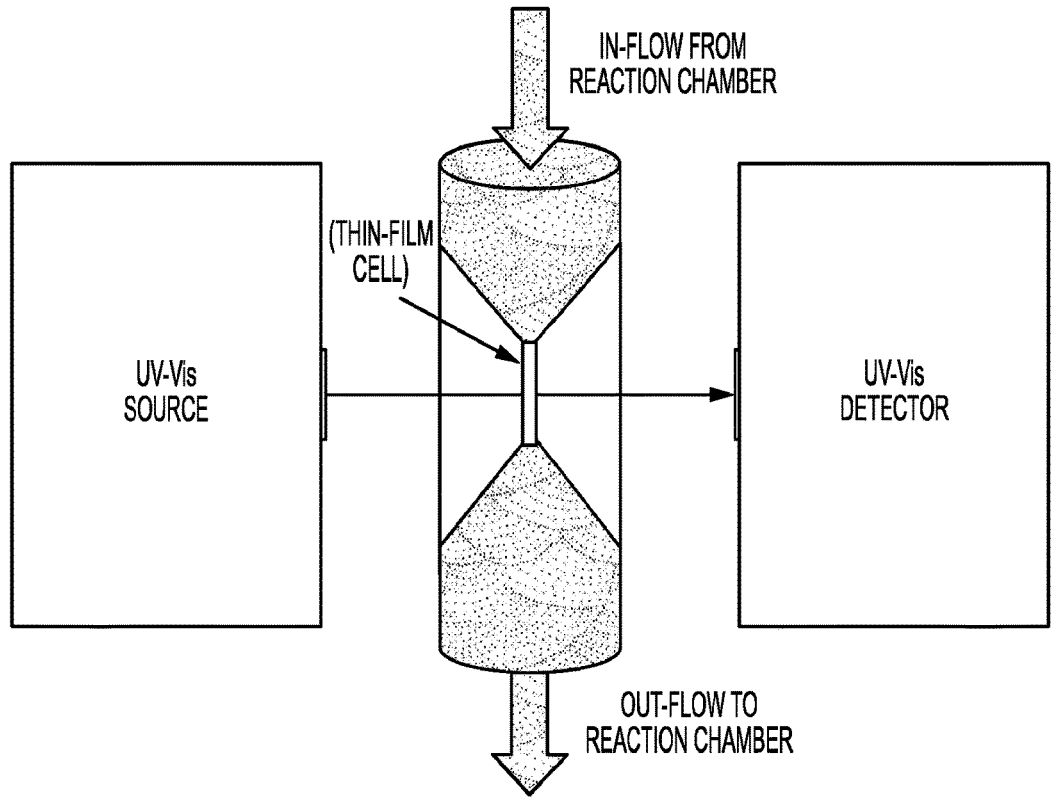
FIG. 3A illustrates an exemplary flow cell that may be used in conjunction with the systems and methods described herein in accordance with embodiments of the present application.

FIG. 3A illustrates an exemplary flow cell that may be used in conjunction with the systems and methods described herein in accordance with embodiments of the present application. System 100 described above may be integrated as an in-situ monitoring tool to actively control/maintain the etch rate for copper etch solutions. In one embodiment, the thin-film cuvette described above may be instead incorporated as a flow cell, wherein the solution may pass continuously from an etch bath reaction chamber (or any other location of solution) through the flow cell, and back out to the chamber. Depending on the copper etch solution, the path length of the flow cell may be modified to ensure proper absorbance of the solution. For instance, in one embodiment, a thin-film flow cell may be utilized with a path length of 0.07 mm. It is noted that fabrication methods described above with respect to cuvettes are applicable to flow cells described herein.

The exemplary flow cell illustrated by FIG. 3A may be used to minimize any perturbation to system 100 due to taking a measurement of Cu etch solution 101. Spectral data may be obtained, e.g., with spectrophotometer 102, at any time as a part of a regular check of the condition of the etch bath and to verify etch rate. In one embodiment, the UV-vis spectra may be monitored continuously, and processing unit 103 programmed to automatically detect when the 850 nm peak is outside whatever the acceptable upper and lower bounds of the etch rate are deemed to be. Additionally, time dependent UV-Vis spectra collected in-situ provides insight into the effects of varying process conditions including idle, ramp up, active production, regeneration, and other processes of the copper etching system in real time. In-situ metrology may serve to shorten the development cycles of etching processes that meet copper etch rate control requirements and achieve overall integration success.

Figure 3B:
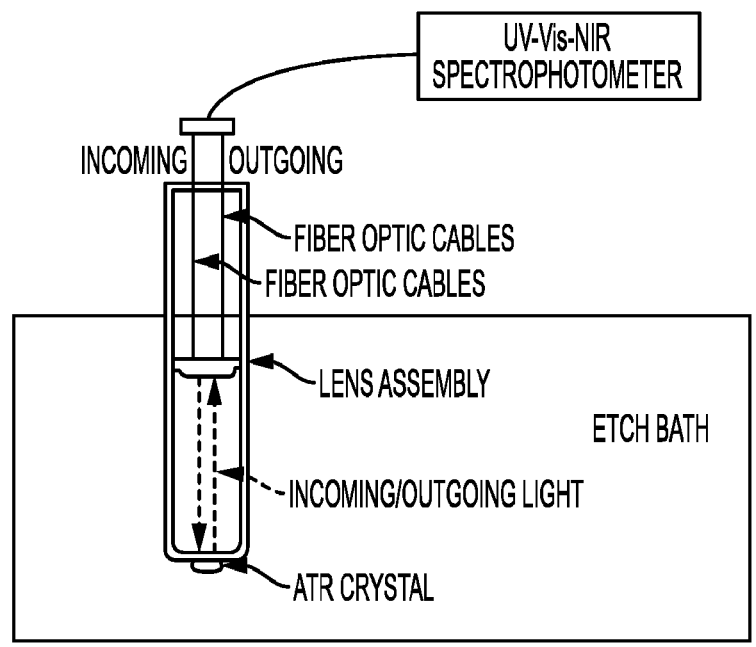
FIG. 3B illustrates an exemplary attenuated total reflection probe that may be used in conjunction with the systems and methods described herein in accordance with embodiments of the present application.

FIG. 3B illustrates an exemplary attenuated total reflection (ATR) probe that may be used in conjunction with the systems and methods described herein in accordance with embodiments of the present application. In addition or as an alternative to utilizing a flow cell, an ATR probe may be integrated as an in-situ monitoring tool to actively control/maintain the etch rate for copper etch solutions. In certain embodiments, one or more optical-fiber ATR probes may be placed at various locations in Cu etch solution 101 to provide chemical-sensitive UV-Vis spectra for monitoring and control. For example, multiple probes may be used in conjunction with each other to measure the differences in chemical equilibrium at different positions in the etch bath. Depending on the compositions of the solution, the ATR probe parameters may be tuned to create maximum signal-to-noise ratio in the resulting spectra.

Figure 4:
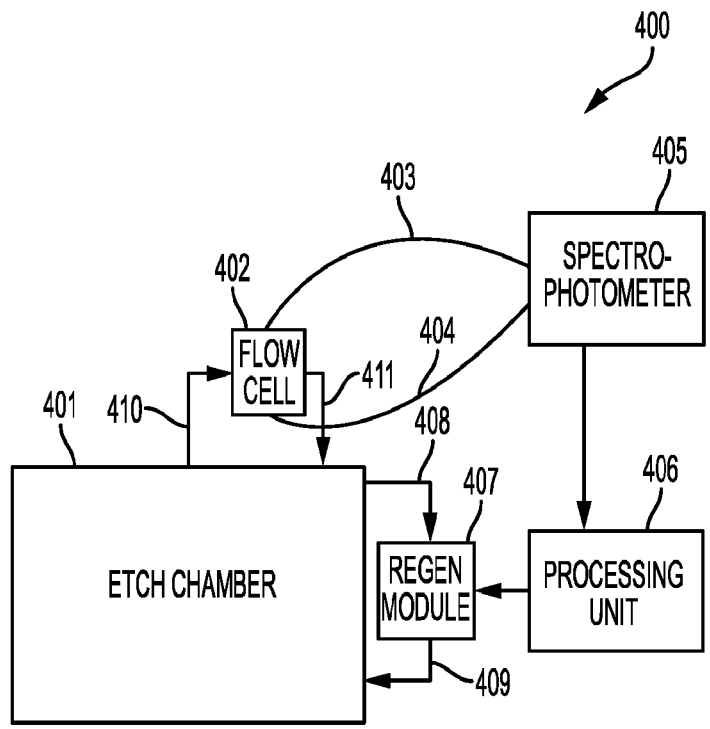
FIG. 4 illustrates a system for monitoring and controlling etch rate of a copper etch solution in accordance with an embodiment of the present application.

FIG. 4 illustrates an exemplary system for monitoring and controlling etch rate of a copper etch solution, according to one embodiment of the application. System 400 may include etch chamber 401, flow cell 402, ATR probe 402b, spectrophotometer 403, processing unit 404, and adjustment module 405. Various components of system 400, e.g., flow cell 402, spectrophotometer 403, processing unit 404, and adjustment module 405, are illustrated as being separate from each other but these components may be integrated together in one or more modules, as will be discussed in more detail. Further, the components of system 400 may be retrofitted to an existing etch chamber 401 or integrated with etch chamber 401.

Etch chamber 401 may include any number of commercially available copper etch bath machines, which are well known in the art. In certain embodiments, etch chamber 401 comprises a copper etch solution, e.g., Cu etch solution 101, which is capable of etching copper features on microelectronics, e.g., PCBs and the like. The copper etch solution flows through flow cell 402 such that absorbance may be measured by spectrophotometer 403. As described above with respect to FIG. 3A, flow cell 402 may comprise varying materials and path lengths depending on the etch solution used and wavelengths desired to be monitored. While FIG. 4 illustrates system 400 as comprising both flow cell 402 and ATR probe 402b, it is appreciated that certain embodiments may include a flow cell (or multiple flow cells) and no ATP probes, while other embodiments may include an ATR probe (or multiple ATR probes) and no flow cells. Further, in other embodiments, a combination of one or more flow cells and one or more ATR probes may be possible.

As illustrated in FIG. 4, flow cell 402 and ATR probe 402b are external to etch chamber 401. Etch solution may flow from etch chamber 401 into flow cell 402 via connection 406 and circulate back into etch chamber 401 via connection 407. In this example, etch chamber 401 may be retrofitted by adapting etch chamber 401 with apertures such that connection 406 and connection 407 may attach thereto. In another embodiment, flow cell 402 may be located within etch chamber 401. For example, connection 406 and connection 407 would be unnecessary, as flow cell 401 would be located within the etch solution. In either of these embodiments, flow cell 402 may be a self-contained unit, and may be coupled to spectrophotometer 403 via connection 408 and connection 409. In certain embodiments, connection 408 and connection 409 may comprise fiber optic cable configured such that absorbance of the etch solution through flow cell 402 may be measured. In other embodiments, flow cell 402 may be located within spectrophotometer 403, rendering connection 408 and connection 409 unnecessary. It is appreciated that the various flow cell 402 embodiments and locations may be altered such that etch chamber 401 is set up in an efficient manner. Further, it is appreciated that the aforementioned configurations for flow cell 402 also are also applicable to ATR probe 402b.

In certain embodiments, spectrophotometer 403 measures the characteristics of the etch solution from etch chamber 401 through flow cell 402. For example, in certain embodiments the absorbance is measured by spectrophotometer 403 via flow cell 402 and/or reflectance is measured via ATR probe 402b. As described above, various wavelengths may be detected by spectrophotometer 403 depending on the etch solution. The various spectra detected by spectrophotometer may then be input into processing unit 404 to calculate etch rate of the etch solution based on the detected absorbance of the etch solution as will be described in further detail below. Processing unit 404 may then determine whether the etch rate of the etch solution within etch chamber 401 is within control limits and/or deviates from a specified value and/or trend. Processing unit 404 may then control adjustment module 405 such that certain chemicals are added to the etch solution of etch chamber 401, thereby adjusting the etch rate. For instance, an oxidizer, HCl, and/or KCl may be added to adjust etch rate of the etch solution. Alternatively, etch time may be adjusted by processing unit 404 with or without adjustment of etch rate.

Figure 5:
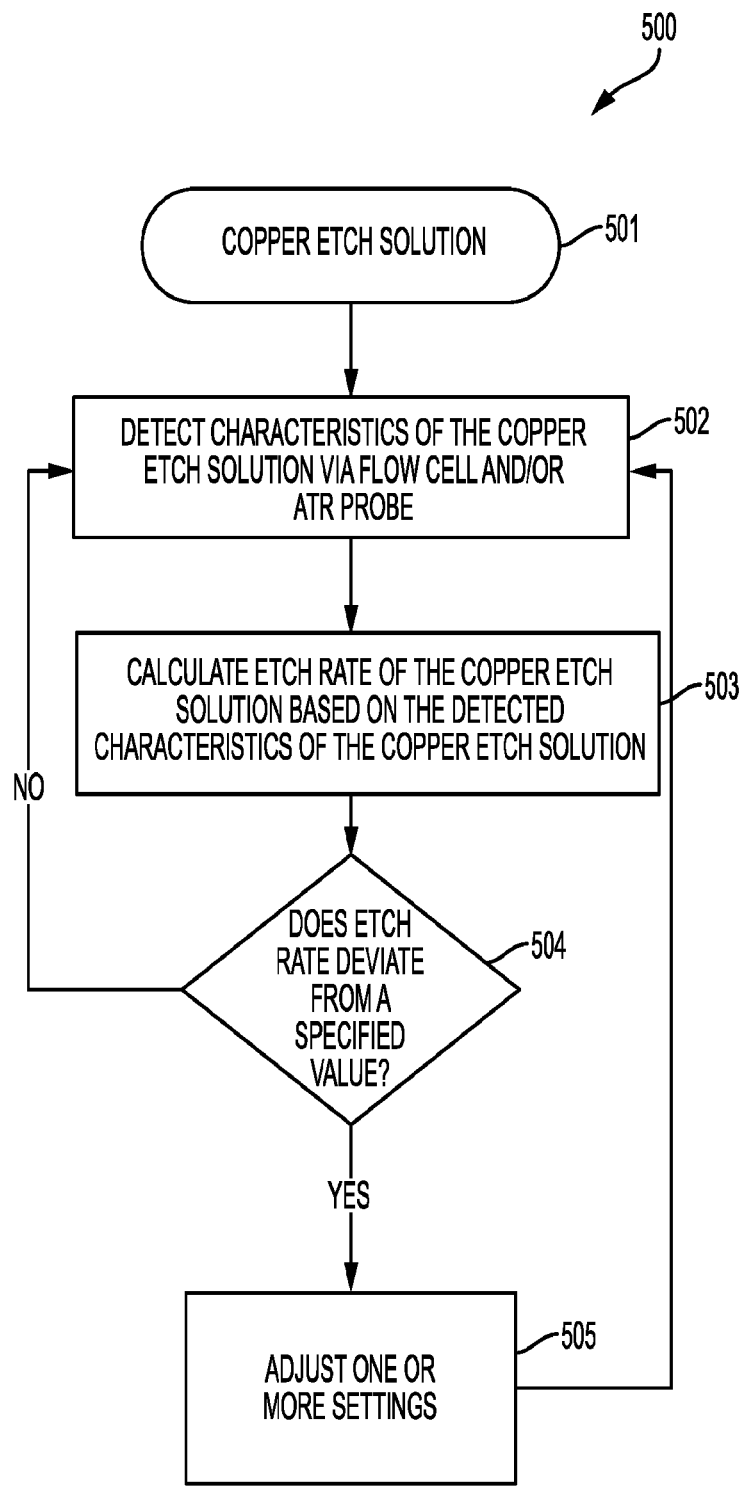
FIG. 5 illustrates a flow diagram of a method for monitoring and controlling etch rate of a copper etch solution in accordance with an embodiment of the present application.

FIG. 5 illustrates a method 500 for monitoring and controlling etch rate of a copper etch solution in accordance with an embodiment of the present application. It is noted that method 500 may be implemented within one or more systems, such as system 100 and system 400 described above. Method 500 may include beginning with a copper etch solution at block 501. The copper etch solution may be in any state, e.g., new, regenerated, adjusted, etc., as discussed herein.

Method 500 may include detecting characteristics of the copper etch solution via a sensor device (e.g., a flow cell and/or an ATR probe) at block 502. In certain embodiments, the flow cell may include any flow cell contemplated with respected to FIG. 3A and/or system 400 described above. For example, a thin-film flow cell with a path length of 0.07 mm may be used with a cupric chloride etch solution. In certain embodiments, the ATR probe may include any ATR probe contemplated with respect to FIG. 3B and/or system 400 described above. A spectrophotometer or other spectroscopy device may be used to detect characteristics of the etch solution through the flow cell and/or the ATR probe. Characteristics may include absorbance, transmittance, and/or reflectance. Characteristics may be detected over a range of wavelengths, e.g., UV, visible, near infrared, and/or infrared. In other embodiments, absorbance may be detected at one or more particular wavelengths, e.g., 750-900 nm. Detection may be continuous, before, during, and/or after the etch.

Method 500 may include calculating the etch rate of the copper etch solution based on the detected characteristics of the copper etch solution at block 503. For instance, in system 100 and system 400, processing units are utilized to analyze the detected characteristics at certain wavelengths and ranges of wavelengths to determine etch rate of the solution. For example, by interpreting multiple data points at various times in the etch process, the etch rate may be calculated and future etch rates dependent on various conditions local to the etch solution predicted. For example, the level of absorbance at 850 nm based on two or more points may result in a linear fit that a processing unit may use to calculate etch rate. A similar calculation may be made by a processing unit or pre-determined equations input for a given solution, allowing for etch rate to be determined. Further, the shape of the detected spectrum may be utilized to calculate and predict etch rate.

Method 500 may include determining whether the calculated etch rate deviates from a specified value at block 504. Depending on the detected absorbance and calculated etch rate, a processing unit may determine whether the etch rate is with control limits. These limits may be statistically controlled or pre-determined. If the etch solution is determined to be within proper limits and/or not deviating from a specified value and/or trend, method 500 repeats from block 502 and absorbance is detected again. In certain embodiments this may be executed continuously. In the event the etch rate is determined to be out of range and/or deviates from a specified value and/or trend, a user may be alerted so that action may be taken. Systems may also be put in place to prevent further microelectronic devices from being etched. Further, in the event of a deviation of the etch rate, the copper etch time and/or solution may be adjusted at block 505. Adjustment to the etch solution may include regenerating the solution, e.g., adding $H_2O_2$. This adjustment may be calculated and implemented automatically by a processing unit, e.g., determining what amounts of chemicals to add to attain desired etch rate and/or adjusting etch time to accommodate for various etch rates. After adjustment, the characteristics may be detected again at block 502 and the process repeats.

Figure 6A:
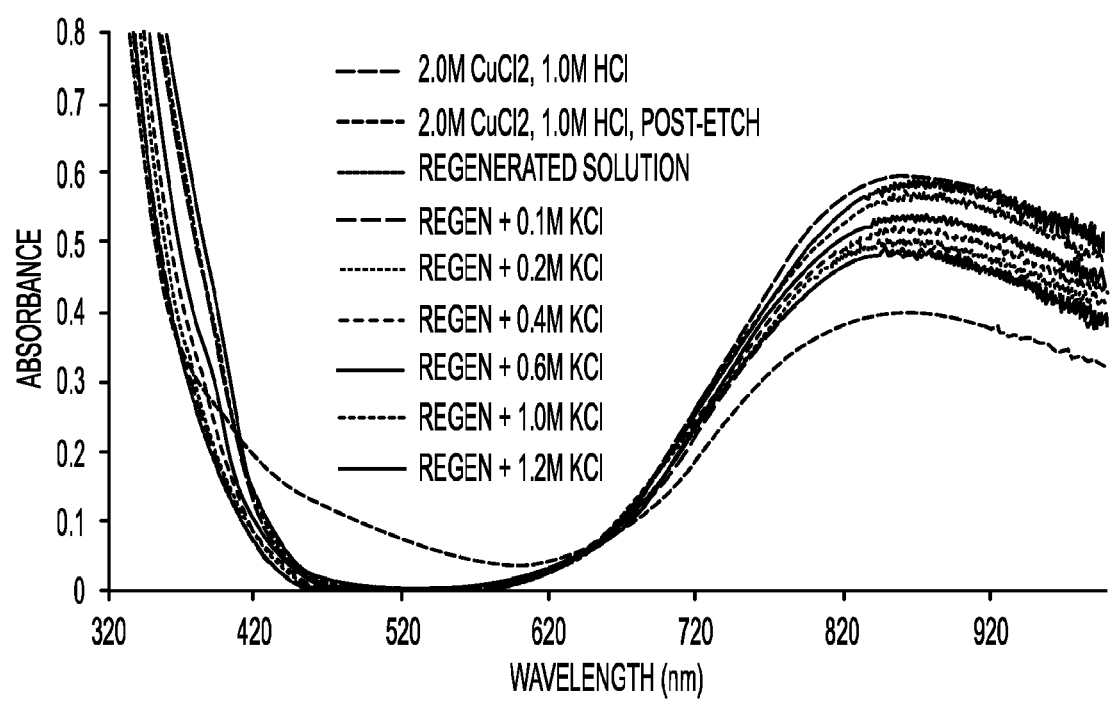
FIG. 6A illustrates the spectra of various etching and regeneration and/or adjustment stages of an exemplary copper etch solution in accordance with an embodiment of the present application.
Figure 6B:
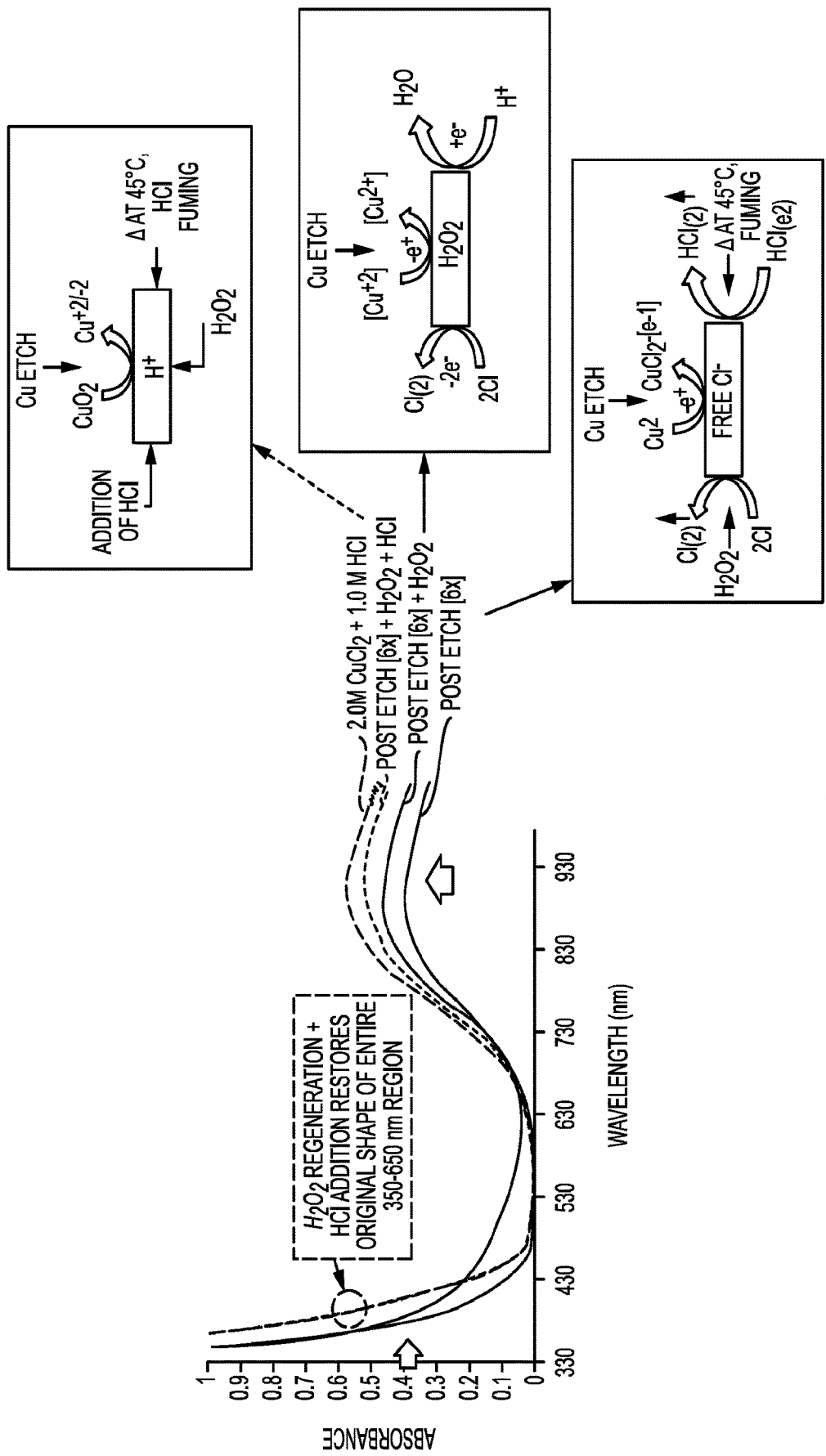
FIG. 6B illustrates the spectra of various etching and regeneration and/or adjustment stages of an exemplary copper etch solution in accordance with an embodiment of the present application.

FIGS. 6A and 6B illustrate the spectra of an exemplary copper etch solution after regeneration and/or adjustment, e.g., addition of $H_2O_2$, HCl, and KCl. As the copper etch progresses, etchants are continuously consumed. Simultaneous regeneration in real time enables production to continue uninterrupted as discussed above. The regeneration of the post-etch solution is typically accomplished by addition of $H_2O_2$ and/or other oxidizers, for instance via adjustment module 405 of system 400 above. As seen in FIGS. 6A and 6B, the addition of only $H_2O_2$ does not sufficiently return the etch solution to its original state. This is apparent as the absorbance characteristics differ, and accordingly etch rate of the regenerated solution differs. For example, FIGS. 6A and 6B demonstrate that the 850 nm d-d transition peak is not fully restored upon addition of only $H_2O_2$ during the regeneration process. However, also shown in FIGS. 6A and 6B, overall chloride concentration in the copper etch solution increases the regeneration efficiency, and thus the overall etch rate. Restoration may be accomplished by adding Cl⁻ to the peroxide-restored solution. For instance, FIGS. 6A and 6B show the 850 nm d-d transition peak increases as KCl is added to the regenerated solution. The spectra of regenerated solution and 1.2 M KCl closely matches the spectra of the initial 2.0 M $CuCl_2$, 1.0M HCl solution. As such, the etch rate more closely matches the initial solution as well. From this analysis, analysis of the peak shape indicates the chloride concentration of the solution. Chloride concentration may then be used as a parameter to predict the etch rate of the regenerated solution.

Figure 7:
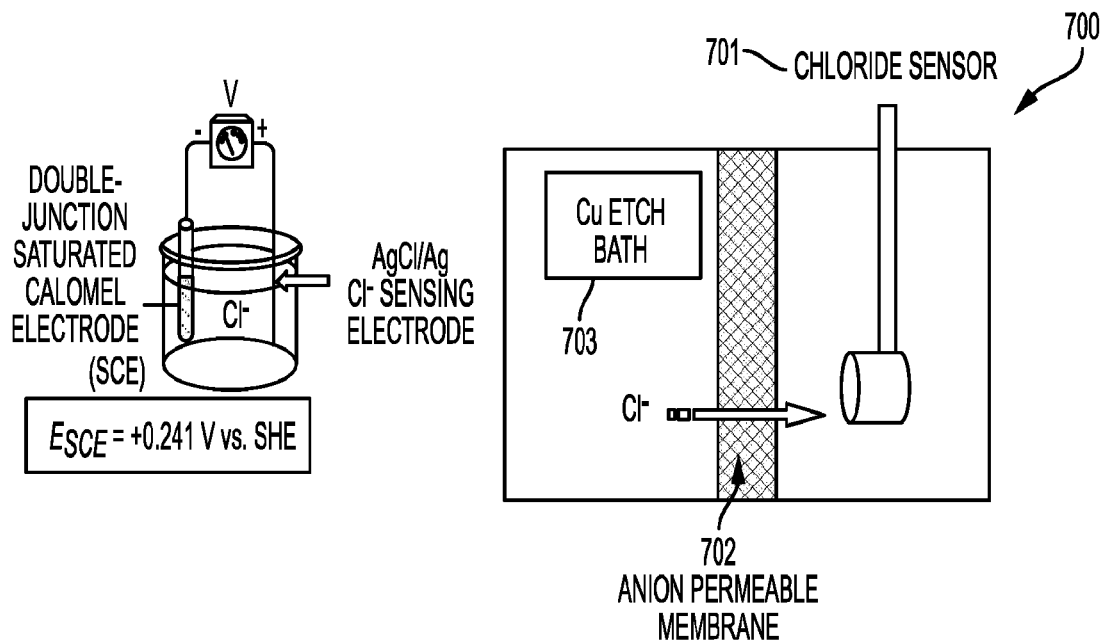
FIG. 7 illustrates a chloride sensing system that may be used in conjunction with the systems and methods described herein in accordance with embodiments of the present application.

FIG. 7 illustrates chloride sensing system 700 that may be used for additional control of copper etch in accordance with embodiments described herein. Chloride sensor system 700 provides additional detection and control of chloride ions to precisely restore the peroxide-regenerated etch solution back to the similar characteristics of the pre-etch solution. Chloride sensing system 700 includes chloride sensor 701, anion permeable membrane 702, and Cu etch bath 703. Chloride sensing system 700 may be incorporated into the other systems described herein.

In certain embodiments, chloride sensor 701 may include a potentiometric chloride sensor. The operating principle of a potentiometric chloride sensor is based on the reaction of $$AgCl_{(s)} + e^- \leftrightarrow Ag_{(s)} + Cl^-_{(aq)}$$

$$E_{AgCl/Ag} = E^0_{AgCl/Ag} - 0.05916 \log a_{Cl^-} = +0.2223 \text{ V} - 0.05916 \log a_{Cl}$$

Due to the very high chloride concentration (>2-6 M) in cu etch bath 703, chloride sensor 701 is interfaced with etch chamber through anion permeable membrane 702. Chloride sensing system 700, after calibration, provides real time monitoring of chloride ion levels. This, combined with the systems described herein may further improve etch rate control.

Chloride sensor 701 may include a modified or unmodified form of silver/silver halide electrode material. In certain embodiments, chloride sensor 701 may be synthesized by any number of processes, e.g., anodizing, electrochemical AgX deposition on Ag wire, etc. Other electrode materials such as $HgS/Hg_2Cl_2$, glassy carbon, modified glassy carbon surface, or porous carbon materials may also be used as the Cl⁻ sensing materials of chloride sensor 701. Additional sensing mechanisms may include titration using silver nitrate or similar titration agent.

Anion permeable membrane 702 may include various polymers, but may also be made of crystals of silver halides (e.g., mono-crystalline or poly-crystalline) or carbon-based materials. Anion permeable membrane 702 may be a polymer, co-polymers, or polymers with crosslinking having one or more functional groups such as polystyrene, divinyl benzene, quaternary ammonium salts, porphyrins, porous carbon paste, porous carbon modified with additives, hydrazine, triethylamine, dimethyl aniline, benzyol peroxide (BPO), and azo-bis-isobutyronitrile (AIBN), and other styrene-based derivatives. Chloride ion measurements may be fabricated with non-destructive spectroscopic methods as Long Period Fiber Grating (LPFG). Laser breakdown Spectroscopy can also be used in tandem with in-situ techniques to measure the chloride ion concentration.

Figure 8:
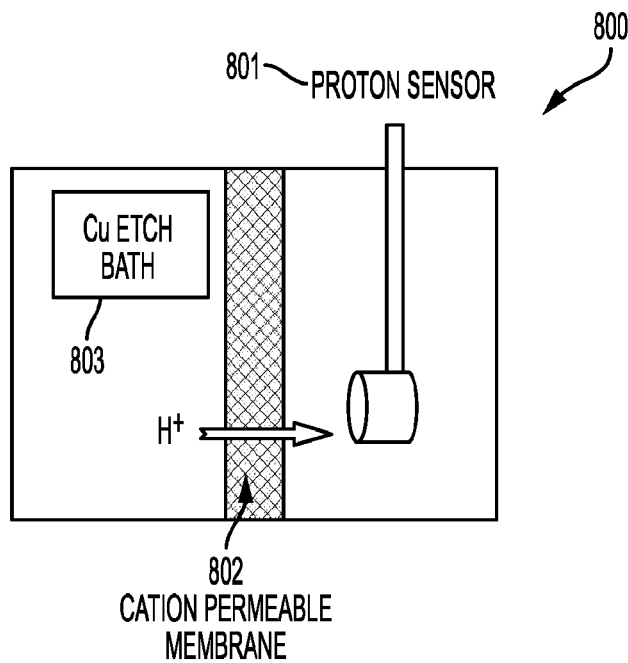
FIG. 8 illustrates a proton sensing system that may be used in conjunction with the systems and methods described herein in accordance with embodiments of the present application.

FIG. 8 illustrates proton sensing system 800 that may be used for additional control of copper etch in accordance with embodiments described herein. Proton sensor system 800 provides additional detection and control of hydrogen ions to restore the peroxide-regenerated etch solution back to the similar characteristics of the pre-etch solution. Proton sensing system 800 includes proton sensor 801, cation permeable membrane 802, and Cu etch bath 803. Proton sensing system 800 may be incorporated into the other systems described herein.

In certain embodiments, proton sensor 801 may include a glass electrode sensor. In other embodiments the concentration of protons may be sensed by using an Ion Sensitive Field Effect Transistor (ISFET). The operating principle of a glass electrode for proton sensor is based on the pH of the solution: $H = -\log [H^+]$. Due to the high proton concentration (1 M) in Cu etch bath 803, proton sensor 801 is interfaced with the etch chamber through cation permeable membrane 802. Proton exchange membranes may include, but are not limited to, Nafion 117, CMI-7000, and NEOSEPTA. The cation exchange membranes, which may be prepared in a lab, may be crosslinked with other polymers to increase permselectivity. Proton sensing system 800, after calibration, may provide real time monitoring of hydrogen ion levels. This, combined with the systems described herein, may further improve etch rate control.

It is noted that the functional blocks and modules in FIGS. 1-8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a processor, e.g., a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for monitoring an etch rate of a copper etch solution, the method comprising:
   providing a cuvette, wherein the cuvette is a thin-film cell configured such that the copper etch solution is contained within the thin-film cell;
   detecting absorbance of the copper etch solution, wherein the absorbance is detected at a plurality of wavelengths; and
   calculating, based on two-dimensional analysis of a shape of data points of the detected absorbance of the copper etch solution, the etch rate of the copper etch solution.

2. The method of claim 1, wherein the two-dimensional analysis indicates peak height and peak shape of features in the data points.

3. The method of claim 1, wherein the analyzing is with respect to shapes of data points of prior detected absorbance at the plurality of wavelengths.

4. The method of claim 1 further comprising:
   determining, based on the detected absorbance of the copper etch solution, chemical equilibrium corresponding to the copper etch solution.

5. The method of claim 4, wherein the chemical equilibrium includes a Cu(I)/Cu(II) ratio in the copper etch solution.

6. The method of claim 1, wherein the copper etch solution is a cupric chloride solution.

7. The method of claim 1, wherein the thin-film cell has a path length less than 0.1 mm.

8. The method of claim 1 wherein one or more of the plurality of wavelengths are in the range of 750 to 900 nm.

9. The method of claim 1 wherein the plurality of wavelengths includes 860 nm.

10. The method of claim 1, further comprising:
    adjusting the etch rate of the copper etch solution, wherein the adjusting includes adding hydrochloride to the copper etch solution.

11. The method of claim 1, wherein a chloride concentration of the copper etch solution is calculated based on the shape of the data points.

12. A method for controlling etch rate of a copper etch solution, the method comprising:
    detecting, by a spectrophotometer, characteristics of the copper etch solution at a plurality of wavelengths;
    calculating, based on two dimensional analysis of a shape of data points of the detected characteristics of the copper etch solution, the etch rate of the copper etch solution; and adjusting one or more settings corresponding to the copper etch solution in response to the calculated etch rate deviating from a specified value.

13. The method of claim 12, wherein the detected characteristics of the copper etch solution include at least one of absorbance, reflectance, and transmittance.

14. The method of claim 12, wherein the detecting includes measuring characteristics of the copper etch solution via a flow cell.

15. The method of claim 14, wherein the flow cell comprises a thin-film cell having a path length of less than 0.1 mm.

16. The method of claim 15, wherein the thin-film cell is a quartz thin-film cell, the quartz thin-film cell having a path length of 0.07 mm.

17. The method of claim 14, wherein the flow cell is configured to be remote from the spectrophotometer.

18. The method of claim 17, wherein the flow cell is located within the copper etch solution and coupled to the spectrophotometer via one or more fiber optic cables.

19. The method of claim 17, wherein the flow cell is located outside of the copper etch solution, wherein the flow cell is coupled to the spectrophotometer via one or more fiber optic cables and adapted to receive the copper etch solution via tubes connected to the copper etch solution.

20. The method of claim 12, wherein the detecting includes measuring characteristics of the copper etch solution via an attenuated total reflection probe.

21. The method of claim 20, wherein the attenuated total reflection probe is configured to be remote from the spectrophotometer.

22. The method of claim 12, wherein adjusting the one or more settings includes adjusting the etch rate of the copper etch solution.

23. The method of claim 22, wherein adjusting the etch rate includes adding potassium chloride to the copper etch solution.

24. The method of claim 12, wherein adjusting the one or more settings includes adjusting an etch time for performing etching using the copper etch solution in response to the calculated etch rate deviating from a specified value.

25. The method of claim 12, further comprising:
generating an alert in response to the calculated etch rate deviating from the specified value.

26. The method of claim 12, wherein adjusting the one or more settings is automatic in response to the calculated etch rate deviating from the specified value.

27. The method of claim 12, further comprising:
detecting, by a chloride sensor, chloride ion levels in the copper etch solution; and
adjusting, based on the detected chloride ion levels, the one or more settings corresponding to the copper etch solution.

28. The method of claim 12, further comprising:
detecting, by a proton sensor, hydrogen ion levels in the copper etch solution; and
adjusting, based on the detected hydrogen ion levels, the one or more settings corresponding to the copper etch solution.

29. An etch rate monitoring system, the system comprising:
a sensor device configured to be utilized with a copper etch solution;
a spectrophotometer coupled to the sensor device, wherein the spectrophotometer is configured to detect characteristics of the copper etch solution at a plurality of wavelengths; and
at least one processing device configured to:
monitor the detected characteristics of the copper etch solution; and
calculate the etch rate of the copper etch solution based on a two-dimensional analysis of a shape of data points of the detected characteristics of the copper etch solution.

30. The system of claim 29, wherein the detected characteristics of the copper etch solution include at least one of absorbance, reflectance, and transmittance.

31. The system of claim 29, wherein the sensor device includes a flow cell.

32. The system of claim 31, wherein the flow cell comprises a thin-film cell having a path length of less than 0.1 mm.

33. The system of claim 32, wherein the thin-film cell is a quartz thin-film cell, the quartz thin-film cell having a path length of 0.07 mm.

34. The system of claim 31, wherein the flow cell is configured to be remote from the spectrophotometer.

35. The system of claim 34, wherein the flow cell is located within the copper etch solution and coupled to the spectrophotometer via one or more fiber optic cables.

36. The system of claim 31, wherein the flow cell is located outside the copper etch solution, wherein the flow cell is coupled to the spectrophotometer via one or more fiber optic cables and adapted to receive the copper etch solution via tubes connected to the copper etch solution.

37. The system of claim 29, wherein the sensor device includes an attenuated total reflection probe.

38. The system of claim 29, wherein the at least one processing device is further configured to adjust the etch rate of the copper etch solution in response to the calculated etch rate.

39. The system of claim 38, wherein the etch rate is adjusted by adding hydrogen peroxide to the copper etch solution.

40. The system of claim 38, wherein adjusting the etch rate is automatic in response to the calculated etch rate deviating from a specified value.

41. The system of claim 29, wherein the at least one processing device is further configured to adjust an etch time for performing etching using the copper etch solution in response to the calculated etch rate deviating from a specified value.

42. The system of claim 29, wherein the at least one processing device is further configured to generate an alert in response to the calculated etch rate deviating from a specified value.

43. The system of claim 29, further comprising:
a chloride sensor configured to detect chloride ion levels in the copper etch solution; and
wherein the at least one processing device is further configured to adjust, based on the detected chloride ion levels, the copper etch solution.

44. The system of claim 29, further comprising:
a proton sensor configured to detect hydrogen ion levels in the copper etch solution; and
wherein the at least one processing device is further configured to adjust, based on the detected hydrogen ion levels, the copper etch solution.

* * * * *

UNITED STATES PATENT AND TRADEMARK OFFICE
CERTIFICATE OF CORRECTION

PATENT NO. : 11,099,131 B2
APPLICATION NO. : 16/465238
DATED : August 24, 2021
INVENTOR(S) : Oliver Ming-Ren Chyan et al.

Page 1 of 1

It is certified that error appears in the above-identified patent and that said Letters Patent is hereby corrected as shown below:

In the Specification

At Column 7, Line number 19, delete "50-200 path" and replace with --50-200 μm path--.
At Column 7, Line number 21, delete "1-10 tan path" and replace with --1-10 μm path--.
At Column 14, starting at Line number 11, delete "Additional sensing" and replace with --Additional Cl⁻ sensing--.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*